US006709579B1

(12) United States Patent
Singleton et al.

(10) Patent No.: US 6,709,579 B1
(45) Date of Patent: Mar. 23, 2004

(54) CURB INLET FILTER

(75) Inventors: Earl Roger Singleton, Oxford, GA (US); Raymond Joseph Dobbs, McDonough, GA (US)

(73) Assignee: Silt-Saver, Inc., Conyers, GA (US)

( * ) Notice: Subject to any disclaimer, the term of this patent is extended or adjusted under 35 U.S.C. 154(b) by 0 days.

(21) Appl. No.: 10/057,580

(22) Filed: Jan. 24, 2002

(51) Int. Cl.$^7$ .............................................. B01D 29/11
(52) U.S. Cl. .................. 210/163; 210/474; 210/497.01; 210/499; 404/4
(58) Field of Search ................................ 210/163, 164, 210/473, 474, 488, 489, 497.01, 499; 404/4, 5

(56) References Cited

U.S. PATENT DOCUMENTS

| 248,559 | A | * | 10/1881 | Jackson ........................ 404/4 |
| 3,695,443 | A | * | 10/1972 | Schmidt, Jr. ............ 210/497.01 |
| 3,830,373 | A | * | 8/1974 | Sixt et al. ............... 210/497.01 |
| 4,094,790 | A | * | 6/1978 | Schmidt, Jr. ............ 210/497.01 |
| 4,180,464 | A | * | 12/1979 | Beane ..................... 210/497.01 |
| 5,345,741 | A | * | 9/1994 | Slater et al. ................. 210/164 |
| 5,403,474 | A | * | 4/1995 | Emery ......................... 210/163 |
| 5,632,888 | A | * | 5/1997 | Chinn et al. ................. 210/163 |
| 5,948,250 | A | * | 9/1999 | Middleton ................... 210/488 |
| 5,954,952 | A | * | 9/1999 | Strawser, Sr. ............... 210/164 |
| 6,017,166 | A | * | 1/2000 | Mossburg, Jr. ................. 404/4 |
| 6,261,445 | B1 | * | 7/2001 | Singleton .................... 210/163 |

OTHER PUBLICATIONS

Georgia Soil and Water Conservation Commission; "Curb Inlet Filter;" Field Manual for Erosion and Sedimennt Control in Georgia, 3$^{rd}$ Edition, 1997, pp 86–87.*
Georgia Soil and Water Conservation Commission; "Curb Inlet Protection"; *Manual for Erosion and Sediment Control in Georgia*; Fifth Edition, 2000; p. 6–140.
Georgia Soil and Water Conservation Commission; "Curb Inlet Filter"; *Manual for Erosion and Sediment Control in Georgia*; Fifth Edition, 2000; p. 6–144.

* cited by examiner

*Primary Examiner*—Christopher Upton
(74) *Attorney, Agent, or Firm*—Womble Carlyle Sandridge & Rice, PLLC

(57) ABSTRACT

A curb inlet filter for temporarily enclosing the curb inlet of a storm drainage system during the construction of a road system in commercial and residential developments is adapted to be placed adjacent a curb inlet in order to enable storm water runoff to drain into the inlet while preventing silt and debris from being carried into and collected therein. The curb inlet filter includes an elongated body having a first and a second end to which are attached first and second weighted anchors. The elongated body includes a filter medium that may enclose a support member. The filter medium filters silt and debris from water passing through the filter and the weighted anchors help to maintain the filter in place adjacent the curb inlet.

10 Claims, 2 Drawing Sheets

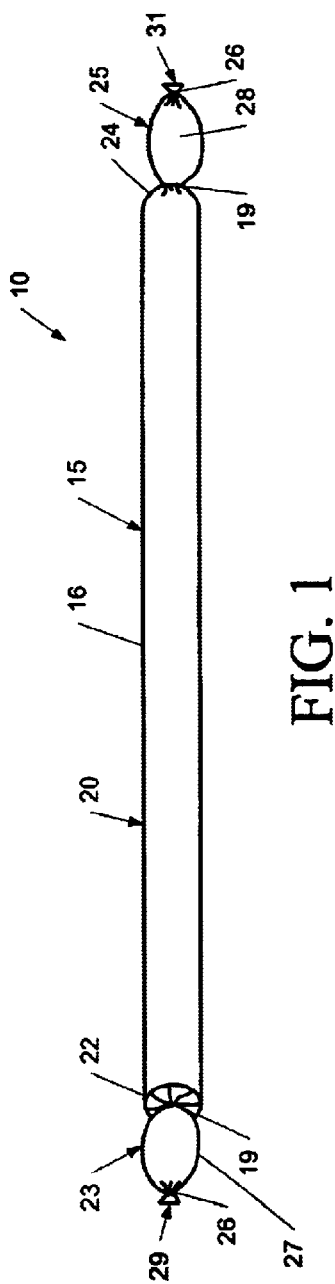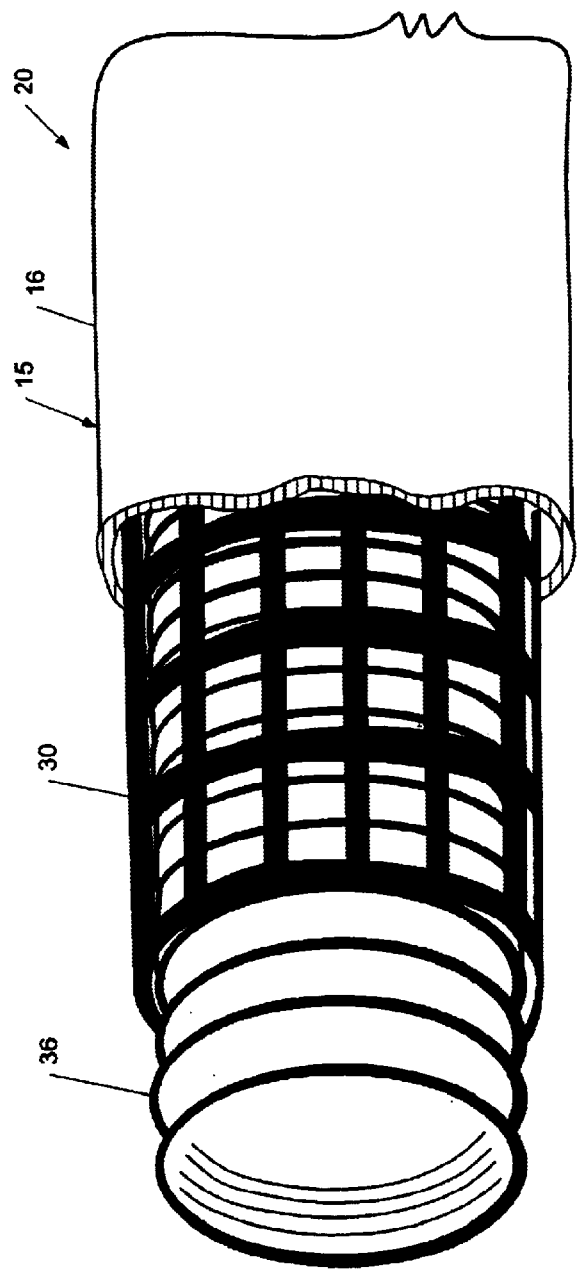

CURB INLET FILTER

FIELD OF THE INVENTION

The present invention generally relates to devices for filtration of water entering storm water drainage systems through a roadway curb opening, and in particular to a barrier filter for a curb inlet of a storm water drainage system adapted to filter silt and debris from storm water passing through the curb inlet and into the storm water drainage system.

BACKGROUND OF THE INVENTION

In the construction of streets, highways, residential housing developments, commercial developments, schools, airports and similar other types of construction projects, the road system generally is first marked out and the streets of the development are cleared and graded. Thereafter, the storm water drainage system for the development is constructed, which typically includes the underground drainage pipes, collection basins, culverts, and drop inlets that form the connection between the storm water drainage system and the finished street side curb inlet. At which time, the storm water drainage system connected to the curb inlets must be kept substantially free of silt and sediment during the remaining phases of construction, pursuant federal, state and local clean water regulations and building codes. Keeping silt and sediment out of the collection basins is, however, difficult given additional grading on site wherein silt and sediment tends to remain unstable and easily migrates towards the sides of the street by wind, water and construction activity and consequently into the open curb inlets. If silt and sediment are washed into or otherwise collected within the collection basins and/or other parts of the drainage system, the collection basins can become clogged and it becomes necessary to send workers down into the collection boxes to manually clean out the dirt and/or debris that has been washed or accidentally dropped into the collection basins to comply with clean water regulations. Such cleaning operations are difficult as the pipes are somewhat cramped, making it difficult to maneuver, and there is also the danger of cave-ins or collapses of the silt, sediment, dirt, and etc. that has built up around the sides of the collection basins, creating a significant risk of injury or even death to the workers below, as well as the negative environmental impact and clean water regulation violations from the migrating sediment.

Although the simplest solution to this problem would seem to be to completely seal the curb inlet, this solution is not feasible as storm water must be permitted to drain through the drainage system of the development during construction to permit the ground to dry and to prevent storm water from eroding the work site and carrying soil and debris to adjacent lots, buildings or state waters. The streets and roadways must also be kept clear to prevent a potential traffic hazard from standing water.

In the past, various filter systems for protecting the curb inlets of the storm water drainage system have been utilized. Unfortunately, most of these systems have suffered from various disadvantages, including lack of portability and ineffective anchoring to maintain the filter system in place during heavy flows of storm water. Such systems include weir arrangements constructed of gravel supported by a wire screen and the like; rolled bundles of filter material, such as coir wattle; arrangements of cinder blocks loosely wrapped with geotextile fence material and arrangements of filtering rocks contained within loosely woven cloth, these latter two arrangements being commonly referred to as "pigs-in-a-blanket." These types of filter systems, however, often tend to be either difficult to transport and deploy or, after being deployed, tend to be insufficiently stable to maintain their position in the face of rushing water, wind or other forces and do not meet current clean water regulations.

Accordingly, it can be seen that a need exists for a system for covering and protecting curb inlets of a storm water collection basin of a drainage system to prevent silt and sediment from migrating into the inlet while still allowing for the free and substantially complete drainage of storm water runoff into the curb inlet.

SUMMARY

Briefly described, the present invention generally comprises a curb inlet filter that forms a temporary barrier or filter for filtering runoff water entering a curb inlet connected to a storm water drainage system. The curb inlet filter enables water to pass therethrough and into the curb inlet, while preventing a substantial portion of silt and debris flowing with the water from passing into the curb inlet. The curb inlet filter generally includes an elongated body having a first end and a second end to which first and second weighted anchors are attached, respectively. The elongated body further typically includes one or more support members encapsulated within a filter medium that assists in the filtering of water running to the curb inlet by blocking silt and debris, while allowing water to pass therethrough. Other support member arrangements are also contemplated, including those where at least a portion of the filter media provides support to the body. The filter medium generally includes geosynthetic materials, wire screens, meshes, polyesters, nylons, natural woven fibers and combinations thereof, or other appropriate filtration material. The filter medium typically is formed into a sleeve or cover that encloses one or more support members of the body.

The body support members generally include rigid supports or ribs, such as polymeric pipes, beams or tubing, and generally also will include a polymeric grating or similar structure that serves to provide structure, form and support to the filter medium while allowing water to pass therethrough. The polymeric grating may, for example, include a rolled section of a high-density polyethylene geo-grid material. The polymeric geo-grid material also can be disposed in one or more sections of the support members, which thus combine to form the body of the barrier having a desired configuration and dimensions to fit the dimensions of the curb inlet. For example, the body of the curb inlet filter may be about 4 inches to about 9 inches or more in diameter and about 3–4 feet to about 15 feet in length, depending on the particular dimensions of the curb inlet to be protected.

The weighted anchors of the curb inlet filter are attached to the body of the curb inlet filter and provide sufficient weight to the ends of the elongated body in order to assist in maintaining the placement of the filter. With the ends of the body so weighted, the curb inlet filter is better able to maintain its position adjacent a curb inlet even when wind, rushing water or other forces that may otherwise unintentionally move the filter are applied thereto. The weighted anchors generally include one or more bags formed at the ends of the elongated body of the filter and filled with a weighted material, typically including various types of loose material, such as, for example, rock, dirt, sand and combinations thereof, which can be found at the construction site.

In one embodiment, the sleeve of the filter medium typically extends beyond the ends of the body thereby providing enough fabric on either end to form the bags for the anchors at each end of the body. Each bag may be closed adjacent each body end by twisting the sleeve and/or applying a tie or other fastener thereto. The distal ends of the bags generally are open to allow for the deposit of weighted matter therein. After weighted matter has been deposited in the bags, the distal ends of each bag typically are then closed with a fastener such as a tie, staples, clamps or the like. Thus, the weighted anchors can be attached to the ends of the body or can be integrally formed with the elongated body of the curb inlet filter.

In use, the temporary barrier or curb inlet filter generally is placed adjacent a curb inlet so that the curb inlet filter substantially blocks path from the spillway to the curb. The weighted anchors on either end of the elongated body of the curb inlet filter help maintain the filter in a desired position adjacent the curb inlet. When water runs from the spillway toward the curb inlet, the curb inlet filter substantially filters silt and debris from the water while allowing the water to pass therethrough. When the curb inlet filter is to be moved or removed once its use is finished, the anchor bags generally are removed, emptied or cleared of the weighted matter contained therein to make the filter easier to remove and/or transport.

Various objects, features, and advantages of the present invention will become apparent to those skilled in the art upon reading the following detailed description, when taken in conjunction with the accompanying drawings.

BRIEF DESCRIPTION OF THE DRAWINGS

FIG. 1 is a perspective view of a curb inlet filter embodying the principles of the invention.

FIG. 2 is a side view, with parts broken away, of a section of the elongated body of the curb inlet filter of FIG. 1 with sections cut away.

DETAILED DESCRIPTION

Figure 3:
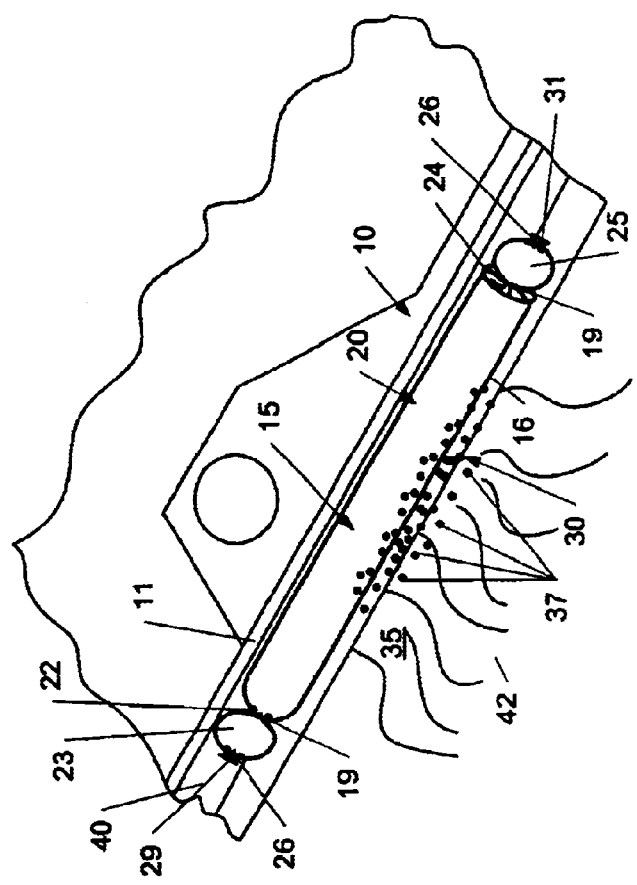
FIG. 3 is a perspective view of the curb inlet filter of FIG. 1 positioned adjacent a curb inlet.

Referring now to the drawings in which like reference numerals indicate like parts throughout the several views, FIGS. 14 illustrate the temporary barrier or curb inlet filter 10 of the present invention. The curb inlet filter 10 generally is designed for temporarily covering and protecting a curb inlet 11 of a storm water drainage system 12, typically during construction taking place nearby so as to filter storm water runoff passing through the curb inlet and into the storm water drainage system and to prevent silt and debris from collecting within the underground pipes and collection boxes of the drainage system. Typically, the storm water drainage system 12 will include underground concrete or metal drainage pipes and/or collection basins 14, with curb inlets 11 mounted thereto.

Figure 4:
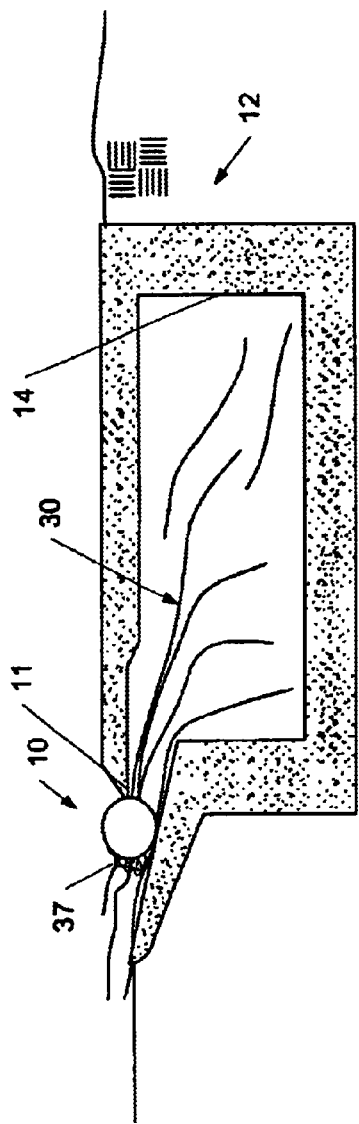
FIG. 4 is a side elevational view taken in cross section of the curb inlet filter and curb inlet shown in FIG. 3.

The curb inlet 11 of a storm water drainage system 12 typically includes a sloped mouth leading from the curb 16 and emptying into a catch basin 14, as shown in FIGS. 3 and 4. The curb inlet 11 takes in storm water and other excess runoff water from the adjacent roadway and site area so as to aid in storm water runoff drainage and to reduce the likelihood of flooding. During nearby construction, the presence of construction-related silt and debris increases the possibility that storm water runoff will carry such material into the storm water drainage system 12 through the curb inlets 11. The curb inlet filter 10 generally is positioned adjacent the curb inlet, as shown in FIGS. 3 and 4, so as to filter storm water runoff passing into the curb inlet and substantially prevent silt and debris 37 from entering the curb inlet 11 but while still allowing water W to flow into the curb inlet.

Referring now to FIGS. 1 and 2, the curb inlet filter 10 generally includes an elongated body 20 that may be cylindrical, rectangular or box-like, triangular or any other convenient shape as desired or necessary for substantially covering and filtering the curb inlet. As shown in FIG. 1, the elongated body 20 includes a first end 22 and a second end 24. The elongated body 20 is substantially covered or encapsulated within a filter medium cover 21 that allows water to pass therethrough and tends to block silt and other debris from passing. The filter medium may include a geosynthetic material or similar mesh or fabric filtering material. As used herein, the term "geotextile" refers to any woven or non-woven synthetic filter material that may act to separate, reinforce, filter, drain, or serve as a moisture barrier. Examples of the materials that can be used as the filter medium include silt screen materials, mesh materials, wire screens, polyesters, nylons, polyvinyl chlorides or woven fiber blankets, such as formed from cotton or coconut fibers, or other synthetic or natural screening material, or any other suitable material that can effectively filter silt and debris from water. The filter medium cover 21 generally will be formed as a wrapping or a sleeve 18 that is applied about and which encloses the elongated body 20.

As shown in FIG. 2, the sleeve 18 of geotextile fabric encloses one or more support members 36 and a polymeric grating 30 that forms a support structure of the elongated body 20. Each support member 36 generally is a substantially rigid structure, typically including a section of polymeric pipe, such as corrugated pipe formed of high-density polyethylene or can include one or more boxes, cylinders or ribs, each generally formed from a durable, high strength, corrosion resistant material such as a plastic. Depending upon the desired size and configuration of the curb inlet filter 10, the support members 36 may include several sections of high-density polyethylene pipe, each having a series of filter openings or slots, and each ranging from about 4 inches to about 9 inches or larger in diameter and about 4 inches to about 12 inches in length, positioned in a stacked or aligned end-to-end arrangement. The support members 36 provide, among other aspects, crush resistance to the elongated body 20 so as to support the curb inlet filter against silt and sediment piled thereagainst. The polymeric grating 30 may be a high-density polyethylene geo-grid or similar latticework that is formed into a roll ranging from about 4 inches to about 9 inches or larger in diameter and about 3–4 feet to about 15 feet in length, although larger or smaller sizes can be used as desired. The body of the curb inlet filter can thus be found with varying dimensions. The grating 30 generally is wrapped or positioned over and extends along the support members, helping contain the support members in an aligned arrangement. Such a polymeric grating 30 provides a strong, lightweight structure to the curb inlet filter 10 to support the filter medium cover spaced from the support members.

Returning to FIG. 1, attached to the first end 22 is a first weighted anchor 23 and a second weighted anchor 25 is attached to the second end 24 of the elongated body 20. The anchors 23 and 25 serve to maintain the position of the curb inlet filter 10 after it has been deployed, without the need for fasteners or other devices to be used to hold the curb inlet filter 10 in place. The anchors 23 and 25 generally are integrally formed with the elongated body 20, typically including first and second bags 27 and 28, formed as a part of the filter medium cover 21, shown in FIGS. 1 and 4, or may be attached to the first and second ends 22 and 24 of the elongated body 20 by fasteners, such as, for example, ties, hooks, staples and the like. As shown in FIGS. 1 and 4, the first and second bags 27 and 28 typically are formed in part by the extension of the filter medium cover that encloses and is a part of the elongated body 20. The filter medium cover 21 generally is extended sufficiently beyond the first and second ends 22 and 24 of the elongated body by an amount sufficient to provide enough material to form the walls of the first and second bags 27 and 28. The ends of bags 27 and 28, which are proximal to the ends of the elongated body 20, may be closed off by twisting the filter medium material and clamping or securing the ends closed with fasteners 19, such as, for example, ties, clamps, staples and the like.

The anchor bags 27 and 28 will contain weighted matter so that they serve as weighted anchors for the curb inlet filter 10. The weighted matter generally will include loose material that may be readily available at a construction site, such as, for example, rock, dirt, sand, concrete, and combinations thereof, and is placed into the bags 27 and 28 just prior to use and then emptied after use, so as to facilitate the transport of the curb inlet filter 10. Other convenient forms of weighted matter are also contemplated by the present invention. After the weighted matter, such as loose rock or dirt, is placed in the bags 27 and 28, the ends 29 and 31 of the bags that are distal to the ends 22 and 24 of the elongated body 20 are closed and secured with fasteners 26, which may be similar to the fasteners 19 used to secure the opposing proximal ends of the bags 27 and 28.

In use, as illustrated in FIGS. 3 and 4, curb inlet filter 10 of the present invention is placed adjacent the mouth of the curb inlet 11 so that water running along the curb 16 or the spillway 42 towards the curb inlet 11 encounters the curb inlet filter 10. As the water W encounters the elongated body 20 of the curb inlet filter 10, it passes through the filter medium cover 21, such as the sleeve 16 of geotextile fabric, and flows through the support members 36 and polymeric grating 30 contained therein, then out of the elongated body 20 and into the curb inlet 11. A substantial portion of the silt and debris 37 carried by the water W is stopped by the curb inlet filter 10 before it enters the curb inlet 11. This substantial portion of the silt and debris 37 accumulates in and around the curb inlet filter 10, but does not pass into the curb inlet 11. The anchors 23 and 25 generally help provide stability and tend to secure the curb inlet filter 10 in position adjacent the curb inlet 11, even when the curb inlet filter 10 is buffeted by strong currents of storm water flowing toward the curb inlet 11. After use, the silt and debris 37 that has collected in and around the curb inlet filter 10 is removed and the curb inlet filter cleaned. Thereafter, the weighted matter contained in anchor bags 27 and 28 generally is removed therefrom and/or the bags themselves are removed and, disposed of so that the curb inlet filter 10 can then be easily transported.

Accordingly, it can be seen that the present invention provides a unique, temporary barrier for protecting a curb inlet of a storm drainage system that can withstand the accompanying force of water passing therethrough and silt and sediment urged or collected thereagainst to prevent this silt and sediment from passing into the curb inlet, while still enabling storm water runoff to be drained from the site without the drainage system or adjacent streams or lots becoming clogged with eroded soil and construction debris.

It will be understood by those skilled in the art that while the present invention has been described in terms of a certain embodiments thereof, numerous modifications, additions and changes can be made thereto without departing from the spirit and scope of the invention as set forth in the following claims.

What is claimed is:

1. A temporary barrier for filtering silt and debris from runoff storm water entering a curb inlet comprising:
   an elongated body having a first end and a second end and comprising a structural support member; and,
   a filter medium sleeve defining a portion of said elongated body and encapsulating said support member, said filter medium sleeve extending beyond said first end to define a first bag and extending beyond said second end to define a second bag, wherein said first bag and said second bag are closed off from said support member.

2. The temporary barrier of claim 1 and further comprising loose material disposed within said first bag and said second bag and closed off from said support member.

3. The temporary barrier of claim 2, wherein said loose material is selected from rock, sand, dirt, concrete, and combinations thereof.

4. The temporary barrier of claim 1, wherein said support member comprises a polymeric grating.

5. The temporary barrier of claim 4, wherein said polymeric grating comprises a high-density polyethylene geo-grid material.

6. The temporary barrier of claim 1, wherein said support member comprises a polymeric pipe.

7. The temporary barrier of claim 1, wherein said support member comprises a polymeric pipe disposed within a polymeric grating.

8. The temporary barrier of claim 1, wherein said filter medium sleeve comprises geotextile material.

9. A temporary barrier for filtering silt and debris from runoff storm water entering a curb inlet comprising:
   an elongated body having a first end and a second end and comprising a polymeric pipe section disposed within a polymeric geo-grid structure;
   a geotextile sleeve defining a portion of said elongated body and encapsulating both said polymeric pipe section and said polymeric geo-grid section, said geotextile sleeve extending beyond said first end to define a first bag and extending beyond said second end to define a second bag, wherein said first bag and said second bag are closed off from said polymeric pipe section and said polymeric geo-grid structure.

10. The temporary barrier of claim 9 and further comprising loose material selected from rock, sand, dirt, concrete and combinations thereof disposed in both said first bag and said second bag.

* * * * *